United States Patent [19]

Herscovici

[11] 4,274,302
[45] Jun. 23, 1981

[54] GEAR REDUCTION APPARATUS

[75] Inventor: Saul Herscovici, Waterloo, Iowa

[73] Assignee: Power Engineering and Manufacturing, Ltd., Waterloo, Iowa

[21] Appl. No.: 19,744

[22] Filed: Mar. 12, 1979

[51] Int. Cl.³ .............................................. F16H 37/06
[52] U.S. Cl. .................................... 74/661; 74/665 B; 74/675
[58] Field of Search ............ 74/665 A, 665 B, 665 D, 74/665 P, 661, 675

[56] References Cited

U.S. PATENT DOCUMENTS

| | | | |
|---|---|---|---|
| 1,616,415 | 2/1927 | Day | 74/661 |
| 2,180,599 | 11/1939 | Menasco | 74/665 B |
| 2,292,186 | 8/1942 | Willgoos | 74/665 B |
| 2,505,853 | 5/1950 | De Pew et al. | 74/665 B |
| 2,513,286 | 7/1950 | Cook | 74/661 |
| 3,438,296 | 4/1969 | Ellis et al. | 74/661 X |
| 4,170,905 | 10/1979 | Collin | 74/661 |

FOREIGN PATENT DOCUMENTS

| | | | |
|---|---|---|---|
| 587967 | 1/1925 | France | 74/675 |
| 157894 | 3/1922 | United Kingdom | 74/665 B |
| 397266 | 8/1933 | United Kingdom | 74/675 |

Primary Examiner—Wm. Carter Reynolds
Attorney, Agent, or Firm—Zarley, McKee, Thomte, Voorhees & Sease

[57] ABSTRACT

A gear reduction apparatus includes a housing having first and second input shafts rotatably mounted therein and first and second flywheels mounted on the first and second input shafts respectively. Each input shaft is adapted to be connected to a power source and includes a toothed gear portion in mesh with a toothed gear portion of an output power mechanism which is thereby rotated at a lower angular velocity than the input shafts. The output power means may include a planetary gear system for further speed reduction prior to connection to a driven member.

7 Claims, 3 Drawing Figures

GEAR REDUCTION APPARATUS

BACKGROUND OF THE INVENTION

This invention relates generally to gear reduction apparatus and more particular to an improved gear reduction apparatus having a pair of input shafts and a pair of flywheels, each mounted on a respective input shaft.

In the manufacture of excavating equipment particularly, the working member of an excavating machine is commonly driven by a hydraulic motor power source. On certain equipment, it is advantageous to provide a pair of small hydraulic motors for driving the working member as opposed to a single larger motor. The connection between the hydraulic motors and working members includes a speed reduction gearbox which must therefore include a pair of input shafts, for driving a single output power mechanism.

Several problems have heretofore been experienced in connection with the construction and use of such dual input drive systems for machinery such as excavating equipment. First, in order to achieve the maximum power output, each motor should apply a generally equal and constant driving force to its respective input shaft. But a pair of hydraulic motors cannot be directly mechanically interconnected for operation in unison without expensive modifications to the motors. Secondly, periodic surges of power from one motor or the other tend to cause an imbalance of forces which results in rough or irregular operation of the moving parts within the gearbox. Finally, because the working member of an excavating machine often encounters heavy impact loads, there is the problem of such loads being transmitted back to the motors through the gearbox with possible resultant damage to the motors.

It is therefore a primary object of the present invention to provide an improved gear reduction apparatus.

A further object of the invention is to provide a gear reduction apparatus adapted to coordinate and smooth out the operation of a pair of drive motors.

A further object of the invention is to provide a gear reduction apparatus having a pair of input shafts and means to protect the motors which drive the shafts from loads transmitted back to the gear reduction apparatus from the driven member.

A still further object of the invention is to provide a gear reduction apparatus which is simple in construction, durable in use and efficient in operation.

These and other objects will be apparent to those skilled in the art.

SUMMARY OF THE INVENTION

A gear reduction apparatus includes a housing and first and second input shafts rotatably mounted in the housing and adapted to be connected to a power source. Both input shafts have a toothed gear portion thereon. An output power means, which is rotatably mounted in the housing and adapted to be connected to a driven member, includes a toothed gear portion in mesh with the toothed gear portions of the first and second input shafts for rotation of the output power means in response to rotation of the first and second input shafts. A first flywheel is mounted on the first input shaft for rotation therewith and a second flywheel is mounted on the second input shaft for rotation therewith. The flywheels smooth out and stabilize the operation of the gear reduction apparatus by coordinating and smoothing out the operation of the motors which drive the input shafts. Furthermore, sudden impact loads on the driven member are significantly dampened by the flywheels to prevent the transmission of damaging shock to the drive motors through the gear reduction apparatus.

DESCRIPTION OF THE PREFERRED EMBODIMENT

Figure 1:
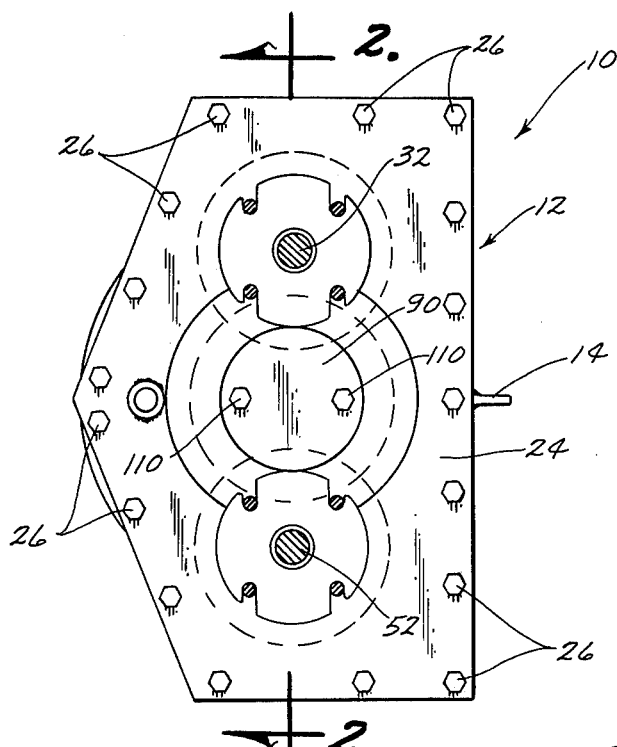
FIG. 1 is an end view of the gear reduction apparatus of the invention.

The gear reduction apparatus of the invention, indicated generally at 10 in FIG. 1, includes a transmission case or housing 12 having a support flange 14 on one side thereof for lifting the apparatus.

Figure 2:
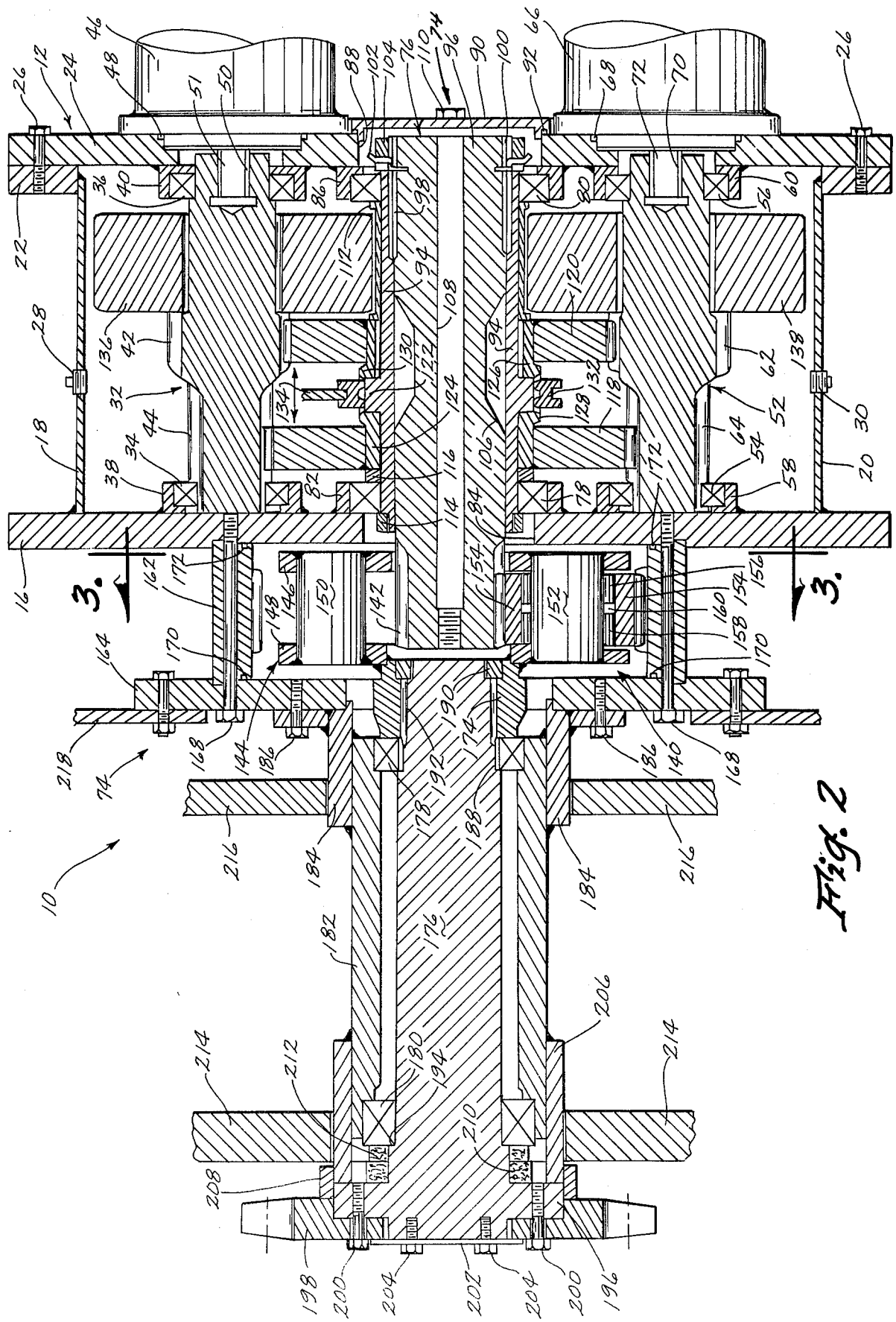
FIG. 2 is an enlarged side sectional view taken along line 2—2 in FIG. 1.

It can be seen in FIG. 2 that the housing 12 includes a rear plate 16 with top and bottom walls 18 and 20 and a front plate 22 to which a cover 24 is secured by bolts 26. A fill plug 28 is provided in top wall 18 and a drain plug 30 is provided in bottom wall 20 for the insertion and drainage of lubricating fluid for the apparatus.

A first input shaft 32 is rotatably mounted in bearings 34 and 36. Bearing 34 is supported within a collar 38 on rear plate 16 and bearing 36 is supported within a similar collar 40 on cover 24. First input shaft 32 has a toothed gear means thereon which includes a first toothed gear portion 42 and a second toothed gear portion 44 which is of smaller diameter than first toothed gear portion 42 and has a fewer number of teeth. A first hydraulic motor 46 is secured to cover 24 with an O-ring seal 48 secured therebetween. The input end of shaft 32 is provided with a splined bore 50 which is adapted to receive the output shaft 51 of first hydraulic motor 46 when the same is secured to the cover 24 as shown.

A second input shaft or pinion 52 is rotatably mounted in bearings 54 and 56. Bearing 54 is supported in a collar 58 on rear plate 16 and bearing 56 is supported in a similar collar 60 on cover 24. Second input shaft 52 has a toothed gear means thereon which includes a first toothed gear portion 62 and a second toothed gear portion 64 which is of smaller diameter than gear portion 62 and has a fewer number of teeth. A second hydraulic motor 66 is secured to cover 24 with an O-ring seal 68 secured therebetween. The input end of shaft 52 is provided with a splined bore 70 which is adapted to receive the output shaft 72 of second hydraulic motor 66 when the same is secured to the cover 24 as shown.

An output power means, referred to generally by reference numeral 74, includes an output shaft 76 which is rotatably mounted in housing 12 by bearings 78 and 80. Bearing 78 is supported within a collar 82 on rear plate 16 at a position surrounding an output shaft opening 84. Bearing 80 is supported within a collar 86 on cover 24 at a position concentric with an access opening 88. A cover 90 which carries O-ring 92 closes and seals access opening 88.

Output shaft 76 is an assembly of a generally tubular primary drive shaft 94 and a secondary drive shaft 96 which is received within the primary drive shaft. The input ends of the drive shafts 94 and 96 are splined as indicated at 98 to couple the shafts for rotation in unison. Secondary drive shaft 96, in addition, is externally threaded at the inlet end as indicated at 100 and has a lock washer 102 and lock nut 104 secured thereon. Secondary drive shaft 96 is furthermore provided with an external annular channel or recess 106 and an axial bore 108. Lock washer 102 is effective for limiting axial movement of the drive shafts toward the output end of the housing.

Primary drive shaft 94 has a shoulder 112 at the input end thereof for abutment against bearing 80 and a threaded output end onto which a lock nut 114 is threaded. A spacer bearing 116 separates bearing 78 from a second toothed gear portion 118 which is axially spaced from a first toothed gear portion 120 by an integral pinion gear portion 122 on primary drive shaft 94. Whereas both the first and second toothed gear portions 120 and 118 are rotatably supported relative to the primary drive shaft 94, each is provided with a respective internal annular lining 126 and 124 respectively which, in turn, include respective gear portions 130 and 128 positioned adjacent to and on opposite sides of the pinion gear portion 122. A shifting collar 132 is axially slidable on pinion gear portion 122 to a first position wherein gear portion 130 of first toothed gear portion 120 is coupled to pinion gear portion 122; a second neutral position wherein neither gear portion 128 nor 130 is coupled to pinion gear portion 122; and a third position wherein gear portion 128 is coupled to pinion gear portion 122. Shifting collar 132 is axially slidable by a shifting fork 134. The shifting mechanism including collar 132 and fork 134 is of conventional construction well known to those skilled in the art.

Accordingly, it is apparent that output shaft 76 may be drivingly coupled to the input shafts 32 and 52 by either the first toothed gear portion on each shaft or the second toothed gear portion on each shaft. Since the first toothed gear portions 42 and 62 on the input shafts have a greater number of teeth than the adjacent second toothed gear means 44 and 64 and since the first toothed gear means 120 of output shaft 76 is of smaller diameter and has a fewer number of teeth than second toothed gear portion 118, a greater degree of speed reduction is achieved by the coupling of the second toothed gear portions than by the coupling of the first toothed gear portions. A two-speed gearbox is thereby provided. Of course, when the shifting collar 132 is in the second or neutral position therefor as shown, there is no transmission of power from the input shafts 32 and 52 to the output shaft 76.

Also within housing 12, there is shown a first flywheel 136 mounted on an input end portion of the first input shaft 32 and a second flywheel 138 mounted on an input end portion of second input shaft 52. The respective shafts and flywheels are coupled by a splined connection for rotation in unison.

The flywheels 136 and 138 are arranged on the input shafts so as to require only a minimum amount of space within the housing 12. It can be seen that the radial extent of the flywheels 136 and 138 from the shafts 32 and 52 is substantially equal to the radial extent of the first toothed gear portion 120 from primary drive shaft 94. Accordingly, the input shafts 32 and 52 are spaced no further from output shaft 76 than is required to accommodate the toothed gear portions 118 and 120 on the output shaft. Furthermore, the flywheels 136 and 138 are axially positioned in abutting relation with the first toothed gear portions 42 and 62 on the respective shafts to minimize the axial length requirements of the shafts.

Referring now to the left side of FIG. 2 or the output end of the gear reduction apparatus 10, it can be seen that the output end of secondary drive shaft 96 extends rearwardly of rear plate 16 through the output shaft opening 84. The rearwardly extended end portion of secondary drive shaft 96 forms part of a planetary gear system 140 which is another part of the output power means 74.

Figure 3:
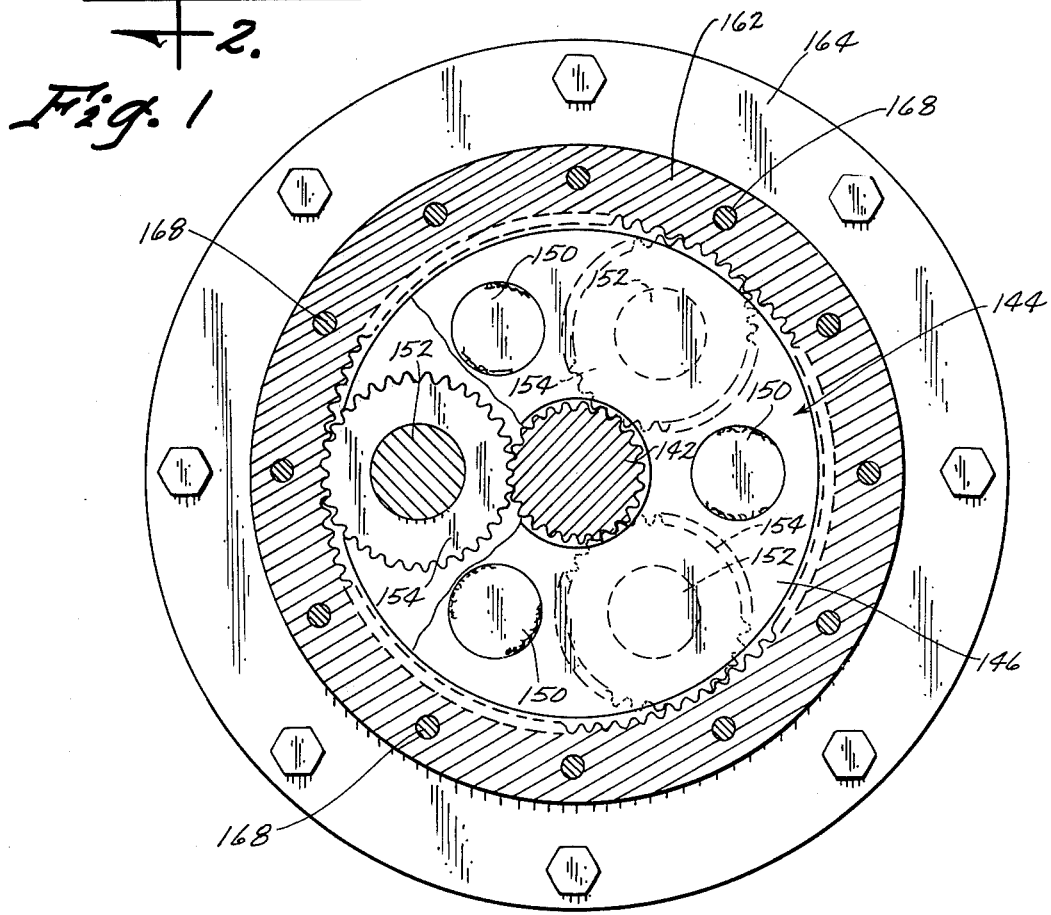
FIG. 3 is an end sectional view showing the planetary gear system of the output power mechanism, as seen on lines 3—3 in FIG. 2.

The rearwardly extended end portion of secondary drive shaft 96 is integrally formed as a sun gear 142. A planetary gear carrier 144 (FIG. 2) is rotatable about sun gear 142 and includes front plate 146 and a rear plate 148 interconnected by a plurality of pins 150 (FIG. 3). Additional pins 152 extend between the front and rear plates for rotatably supporting planetary gears 154 on roller bearings 156 and 158 which sandwich a spacer 160 between them. The planetary gears 154 are internally meshed with the sun gear 142 and externally mesh with a stationary ring gear 162 which is arranged between a ring gear support flange 164 and housing rear plate 16. Bolts 168 secure the support flange and ring gear 162 to the rear plate 16 and a pair of O-rings 170 and 172 seal the ring gear to the flange 164 and rear plate 16 respectively. The planetary gear carrier 144 has a rearwardly extended output collar 174 welded thereto.

Rearwardly of the planetary gear system 140, the output power means 74 further include an output shaft 176 rotatably mounted within bearings 178 and 180. The bearings, in turn, are supported within a tubular housing 182 on which a flanged collar 184 is welded for securement to the ring gear support flange 164 by a plurality of bolts 186. Bearing 178 engages a shoulder 188 on output shaft 176, the extreme forward end of which is threaded to receive a lock nut 190 for axially positioning the output shaft 176 relative to the output collar 174. A spline connection indicated at 192 connects output collar 174 and output shaft 176 for rotation in unison.

The rearward end of output shaft 176 includes an annular shoulder 194 engaged against bearing 180 and an integral annular flange 196 to which an output sprocket 198 is secured by a plurality of bolts 200. A dust cover 202 is secured to the rearward end of output shaft 176 by bolts 204. An extension collar 206 on tubular housing 182 cooperates with annular flange 196 to support a press ring spacer 208. Oil seals 210 and 212 are arranged on the output shaft 176 between annular flange 196 and bearing 180.

In operation, the first and second hydraulic motors 46 and 66 are operated simultaneously to rotate the respective first and second input shafts 32 and 52. The shifting collar 132 is adjusted to either the forward or rearward position therefor to drivingly couple the output shaft 76 to the first and second input shafts. The second toothed gear portions, when engaged, provide a greater degree of gear reduction than the first toothed gear portions. Rotation of the primary drive shaft 94 by either set of toothed gear portions causes rotation of the secondary drive shaft which, in turn, rotates the sun gear 142 of planetary gear system 140. Since the gear ring 162 is stationarily supported, rotation of sun gear 142 effects a rotation of planetary gear carrier 144 in the same direction but at a lower angular velocity for further speed reduction. Finally, output shaft 176 connects the planetary gear carrier 144 to an output gear 198 which may be utilized as the power take-off for driving the working member of an excavating machine or any other member adapted to be driven by hydraulic power. The gear reduction apparatus may be mounted on and secured to a machine by support members arranged as shown at 214, 216 and 218 in FIG. 2.

The first and second flywheels 136 and 138 stabilize and smooth out the operation of the gear reduction apparatus. Any power surge from one of the hydraulic motors is dampened by the inertia effect of the flywheels thereby to coordinate the hydraulic motors so that each applies a generally uniform constant driving force to the output power means. At the same time, any heavy loads suddenly applied to the output power means are dampened by the flywheels to substantially reduce the transmission of impact forces back through the gear reduction apparatus to the hydraulic motors.

Thus there has been shown and described a gear reduction apparatus which accomplishes at least all of the states objects.

I claim:

1. A gear reduction apparatus comprising,
    a housing means,
    a first input shaft rotatably mounted in said housing means and adapted to be connected to a power source, said first input shaft having a toothed gear means thereon,
    a second input shaft rotatably mounted in said housing means and adapted to be connected to a power source, said second input shaft having a toothed gear means thereon,
    an output power means rotatably mounted on said housing means and adapted to be connected to a driven member,
    means for operatively connecting said output power means to said toothed gear means of said first and second input shafts for rotation of said output power means in response to rotation of said first and second input shafts,
    a first flywheel mounted on said first input shaft, and
    a second flywheel mounted on said second input shaft,
    said means for connecting the output power means to the toothed gear means on the first and second input shafts comprising a toothed gear means mounted on said output power means and being in mesh with said toothed gear means of said first and second input shafts,
    the toothed gear means on said first input shaft including a first toothed gear portion and a second toothed gear portion having a fewer number of teeth than said first toothed gear portion,
    said toothed gear means on said output power means including a first toothed gear portion in mesh with the first toothed gear portion of said first input shaft and a second toothed gear portion in mesh with the second toothed gear portion of said first input shaft, said second toothed gear portion of said output power means having a greater number of teeth than the first toothed gear portion thereof, and
    means for selectively coupling one of said first and second toothed gear portions on said output power means to the output power means for rotation therewith.

2. The gearbox of claim 1 wherein said first and second flywheels each have a substantially greater outside diameter than the toothed gear means on the respective input shaft on which each is mounted.

3. The gearbox of claim 2 wherein said first flywheel is axially positioned in abutting relation with said toothed gear means on said first input shaft and said second flywheel is axially positioned in abutting relation with said toothed gear means on said second input shaft.

4. The gearbox of claim 1 wherein said output power means includes
    an output shaft rotatably mounted in said housing means,
    said toothed gear means on said output power means being mounted on said output shaft for rotation therewith,
    a planetary gear system operatively connected to said output shaft, and
    an output means connected to said planetary gear system for rotation at a lower angular velocity than said output shaft, said output means being adapted for connection to a driven member.

5. The gearbox of claim 4 wherein said planetary gear system includes
    a sun gear portion on one end of said output shaft,
    a planetary gear carrier supported for rotation about said sun
    gear portion and including a plurality of planetary gears,
    a ring gear,
    means for fixing said ring gear relative to said housing means at a position around said planetary gear carrier and in mesh with said planetary gears,
    said output means including means for operatively connecting said planetary gear carrier to said driven member.

6. The gearbox of claim 1 wherein the toothed gear means of said second input shaft includes a first toothed gear portion and a second toothed gear portion having a fewer number of teeth than said first toothed gear portion,
    the first toothed gear portion on said second input shaft being in mesh with the first toothed gear portion of said output power means and said second toothed gear portion of said second input shaft being in mesh with the second toothed gear portion of said output power means.

7. The gearbox of claim 6 wherein said first toothed gear portion of said first input shaft is situated axially between said second toothed gear portion and said first flywheel,
    said first toothed gear portion of said second input shaft being axially situated between said second toothed gear portion and said second flywheel.

* * * * *